US012701527B2

(12) United States Patent
Akhtar et al.

(10) Patent No.: US 12,701,527 B2
(45) Date of Patent: Aug. 4, 2026

(54) RADIO ACCESS FALLBACK FOR INTERNET PROTOCOL MULTIMEDIA SUBSYSTEM REGISTRATION

(71) Applicant: Apple Inc., Cupertino, CA (US)

(72) Inventors: Mohammad H. Akhtar, Somerset, NJ (US); Lakshmi N. Kavuri, San Jose, CA (US); Mohamed L. Haidara, West New York, NJ (US); Syed A. Rahim, Allen, TX (US); Rohit Thareja, Pacifica, CA (US); Yong Zhong, Beijing (CN); Sairamm Prabakar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 638 days.

(21) Appl. No.: 17/877,862

(22) Filed: Jul. 29, 2022

(65) Prior Publication Data

US 2023/0073098 A1     Mar. 9, 2023

Related U.S. Application Data

(60) Provisional application No. 63/240,857, filed on Sep. 3, 2021.

(51) Int. Cl.
*H04W 60/00*        (2009.01)

(52) U.S. Cl.
CPC ................................. *H04W 60/005* (2013.01)

(58) Field of Classification Search
CPC ............. H04L 65/1016; H04L 65/1073; H04L 65/1104; H04L 65/1069; H04L 65/1045;

H04L 65/1046; H04L 63/08; H04W 12/06; H04W 60/00; H04W 12/069; H04W 12/08; H04W 8/04; H04M 15/57; H04M 7/006
See application file for complete search history.

(56) References Cited

U.S. PATENT DOCUMENTS

| | | | | |
|---|---|---|---|---|
| 9,602,556 | B1 * | 3/2017 | Cham .................. | H04L 65/1104 |
| 9,986,525 | B1 * | 5/2018 | Chiang .............. | H04L 65/1073 |
| 2017/0171832 | A1 * | 6/2017 | Joshi ..................... | H04W 76/19 |
| 2018/0103500 | A1 * | 4/2018 | Chiang .............. | H04L 65/1073 |
| 2019/0174449 | A1 * | 6/2019 | Shan ..................... | H04W 60/04 |
| 2019/0327699 | A1 * | 10/2019 | Niemi .................. | H04W 60/00 |
| 2021/0044386 | A1 * | 2/2021 | Kaul ....................... | H04L 69/28 |
| 2022/0400360 | A1 * | 12/2022 | Chiang .............. | H04L 65/1016 |
| 2023/0047609 | A1 * | 2/2023 | Kuppelur ............ | H04L 65/1073 |

(Continued)

FOREIGN PATENT DOCUMENTS

| | | |
|---|---|---|
| CN | 108702593 A | 10/2018 |
| CN | 110301130 A | 10/2019 |

(Continued)

OTHER PUBLICATIONS

3rd Generation Partnership Project; Technical Specification Group Core Network and Terminals; Non-Access-Stratum (NAS) protocol for 5G System (5GS); Stage 3 (Release 17), 3GPP TS 24.501 V17.3.1, Jun. 2021, 825 pages.

(Continued)

*Primary Examiner* — Kharye Pope
(74) *Attorney, Agent, or Firm* — Kilpatrick Townsend & Stockton LLP

(57) ABSTRACT
The present application relates to devices and components including apparatus, systems, and methods for IMS registration in wireless networks.

20 Claims, 6 Drawing Sheets

(56)  References Cited

U.S. PATENT DOCUMENTS

2023/0262099 A1*  8/2023  Yang ..................... H04L 47/826
                                                    370/331
2023/0397070 A1*  12/2023  Naik .................... H04W 60/00

FOREIGN PATENT DOCUMENTS

CN          110637477  A      12/2019
CN          112399511  A       2/2021

OTHER PUBLICATIONS

3rd Generation Partnership Project; Technical Specification Group
Services and System Aspects; Policy and charging control archi-
tecture (Release 17), 3GPP TS 23.203 V17.1.0, Jun. 2021, 267
pages.
China Patent Application No. 202210965032.X, Office Action, Jul.
23, 2025, 8 pages.
China Patent Application No. 202210965032.X, Office Action, Dec.
26, 2024, 13 pages.

* cited by examiner

500

RADIO ACCESS FALLBACK FOR INTERNET PROTOCOL MULTIMEDIA SUBSYSTEM REGISTRATION

CROSS-REFERENCE TO RELATED APPLICATION

This application claims the benefit of U.S. Provisional Patent Application No. 63/240,857, filed Sep. 3, 2021, which is fully incorporated herein by reference.

BACKGROUND

Internet Protocol multimedia subsystem (IMS) is a system that resides out of an access network and is connected to a long-term evolution (LTE) or new radio (NR) network through a packet data network (PDN) or user plane function (UPF). The IMS may allow for services such as text, multimedia messages, and voice calls to be correctly delivered through an IP network.

DETAILED DESCRIPTION

Figure 1:
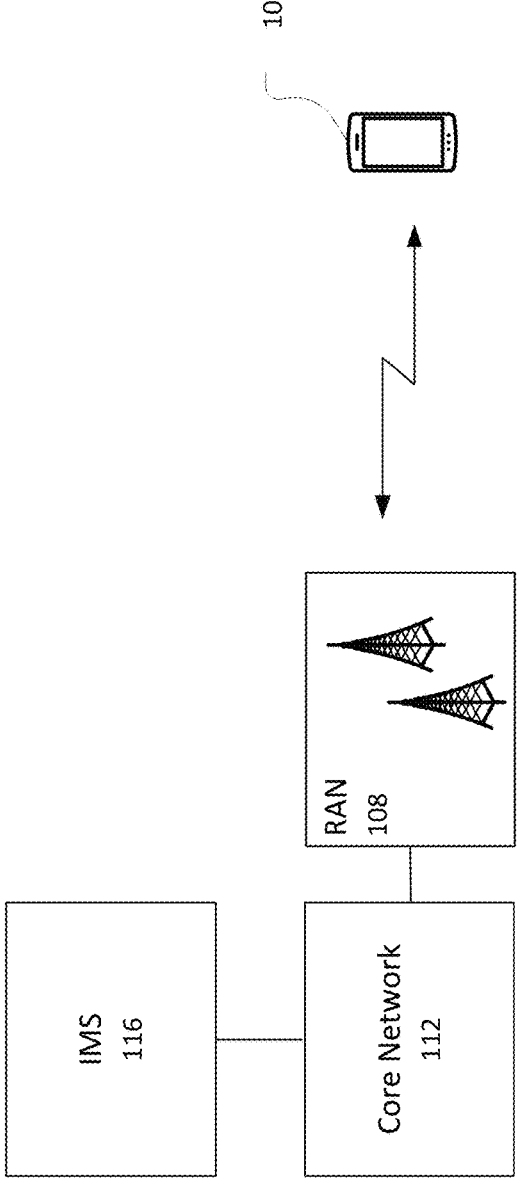
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, and techniques in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A/B" and "A or B" mean (A), (B), or (A and B); and the phrase "(A)B" means (B) or (A and B), that is, A is optional.

The following is a glossary of terms that may be used in this disclosure.

The term "circuitry" as used herein refers to, is part of, or includes hardware components that are configured to provide the described functionality. The hardware components may include an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), or a digital signal processor (DSP). In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, and network interface cards.

The term "user equipment" or "UE" as used herein refers to a device with radio communication capabilities that may allow a user to access network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware elements. A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, or a virtualized network function.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 communicatively coupled with one or more base stations of a radio access network (RAN) 108. The UE 104 and the base stations of the RAN 108 may communicate over air interfaces compatible with 3GPP TSs such as those that define LTE, NR, or later-generation system standards. The base station 108 may be an evolved node B (eNB) to provide one or more LTE cells or a next generation node B (gNB) to provide one or more 5G New Radio (NR) cells.

The network environment 100 may further include a core network (CN) 112. For example, the CN 112 may comprise an evolved packet core (EPC) network, a 5th Generation Core network (5GC), or a later generation core network. The CN 112 may be coupled to the RAN 108 via a fiber optic or wireless backhaul. The CN 112 may provide functions for the UE 104 via the base station 108. These functions may include managing subscriber profile information, subscriber location, authentication of services, or switching functions for voice and data sessions.

The network environment 100 may further include an IMS 116 to provide

Internet protocol (IP) multimedia services to the UE 104. IP multimedia services may include, for example, voice (for example, voice-over-LTE (VoLTE) or voice-over-NR (VoNR)), video, messaging, data, and web-based services. IMS signaling has a highest priority level 1 according to 3GPP TS 23.203 v17.1.0 (2021, Jun. 24) to ensure best in class conversational voice/media services to an end user.

Session initiation protocol (SIP) is a signaling protocol that is primarily involved in "Initiation" and "Closing" of a media transfer used for voice services such as VoLTE/VoNR. The UE 104 may perform an IMS registration for voice/ simple messaging service (SMS) services via the SIP registration mechanism. The UE 104 may perform an initial IMS registration on power-up or airplane mode (APM) toggle. The UE 104 may additionally perform IMS refresh registration on a periodic basis to maintain the IMS registered status.

Any delay in IMS registration over a particular radio access technology (RAT) may lead to undesirable UE performance and poor user experience. For example, without voice over LTE/NR services, the signal bars of user interface may be greyed out irrespective of the conditions of a radio-frequency (RF) channel.

In current implementations, a UE may retry IMS refresh registration on an NR RAT if it fails due to a transmission control protocol (TCP) error or Timer-F expiration. The UE may retry IMS registration in NR even after previous attempts over the NR RAT were unsuccessful. This may lead to consecutive IMS registration failures that may last for a long period of time, for example, more than 300 seconds. During this time, the UE may miss multiple mobile termination (MT) calls and display greyed-out bars on the user interface, leading to poor user experience. This may also lead to VoNR/evolved packet service fall back (EPSFB) voice failures if observed continuously.

3GPP TS 24.501 v17.3.1 (2021, Jul. 2) defines an implementation option in which, if IMS voice is not available, an N1 mode should be disabled and the UE should start a timer for re-enabling the N1 mode capability.

Currently, for IMS initial registration after NR registration, a baseband may include a max_ims_reg_timer (default of 35 seconds) to monitor the IMS registration. If IMS registration does not succeed within this timer, the NR will be blocked for 12 minutes. However, in the case of IMS refresh registration, an application processor does not have such a timer.

Consider the following device operation based on designs of current networks.

An IMS re-registration may be triggered, which may be IMS registration attempt #0 on proxy-call session control function (P-CSCF) #1. The timer-F (non-INVITE transaction timeout timer) may be set to 128 seconds, with a registration throttling timer set to 30 seconds.

After 75 seconds, a TCP socket write error may be caused by POSIX: broken pipe. A timer-E (non-INVITE request retransmit interval, user datagram protocol (UDP) only) may be set to two seconds.

After two additional seconds the timer-E may expire and IMS registration retry attempt #1 may occur on P-CSCF #1. The timer-E (non-INVITE request retransmit interval, UDP only) may be set to four seconds.

After 51 additional seconds, timer-F may expire causing a SIP request timeout. The registration throttling timer may be set to 30 seconds.

After 30 additional seconds, the registration throttling timer may expire and IMS registration retry attempt #2 may occur on P-CSCF #1. Timer-F (non-INVITE transaction timeout timer) may be set to 128 seconds and the registration throttling timer may be set to 30 seconds.

After an additional 75 seconds, a TCP socket write error may occur, caused by POSIX: broken pipe. Timer-E (non-INVITE request retransmit interval, UDP-only) may be set to two seconds.

After an additional two seconds, the timer-E may expire and IMS registration retry attempt #3 may occur on P-CSCF #1. The timer-E (non-INVITE request retransmit interval, UDP only) may be set to four seconds.

After 51 additional seconds, timer-F may expire causing a SIP request timeout. The registration throttling timer may be set to 30 seconds.

After 30 additional seconds, the registration throttling timer may expire and IMS registration retry attempt #4 may occur on P-CSCF #2. Timer-F (non-INVITE transaction timeout timer) may be set to 128 seconds and the registration throttling timer may be set to 30 seconds.

After 26 additional seconds, the user may dump the telephony logs and the UE may recover after APM toggle.

This sequence illustrates a device being stuck in an undesirable state with signal bars grayed out for five minutes. Various embodiments describe mechanisms to avoid such occurrences.

Some embodiments describe the initiation of the forced fallback to LTE after attempting IMS refresh registration on NR for a period of time (for example, 30 seconds), blocking NR, and retrying IMS registration over LTE. This may help the UE 104 avoid getting stuck in a loop of IMS registration failures over NR and may improve overall performance of the UE 104 in the event the IMS registration failures were specific to the NR cells. By performing IMS registration over LTE, a user will be able to make/receive voice calls.

In some embodiments, NR may be unblocked according to an LTE IMS registration status (LTE-IMS-Registration-Status) and camping LTE cells. For example, for a first try to unblock NR (and attempt IMS registration over NR), the UE 104 may unblock NR once IMS registration succeeds on LTE. For the next try to unblock NR, the UE 104 may not unblock NR until the UE 104 moves to a new LTE cell or, in some embodiments, waits for a blocking timer to expire. To avoid a block/unblock loop, maximum threshold for retry attempts may be set. In some embodiments, this threshold may be set to three retries;

however, this may be different in other embodiments.

Figure 2:
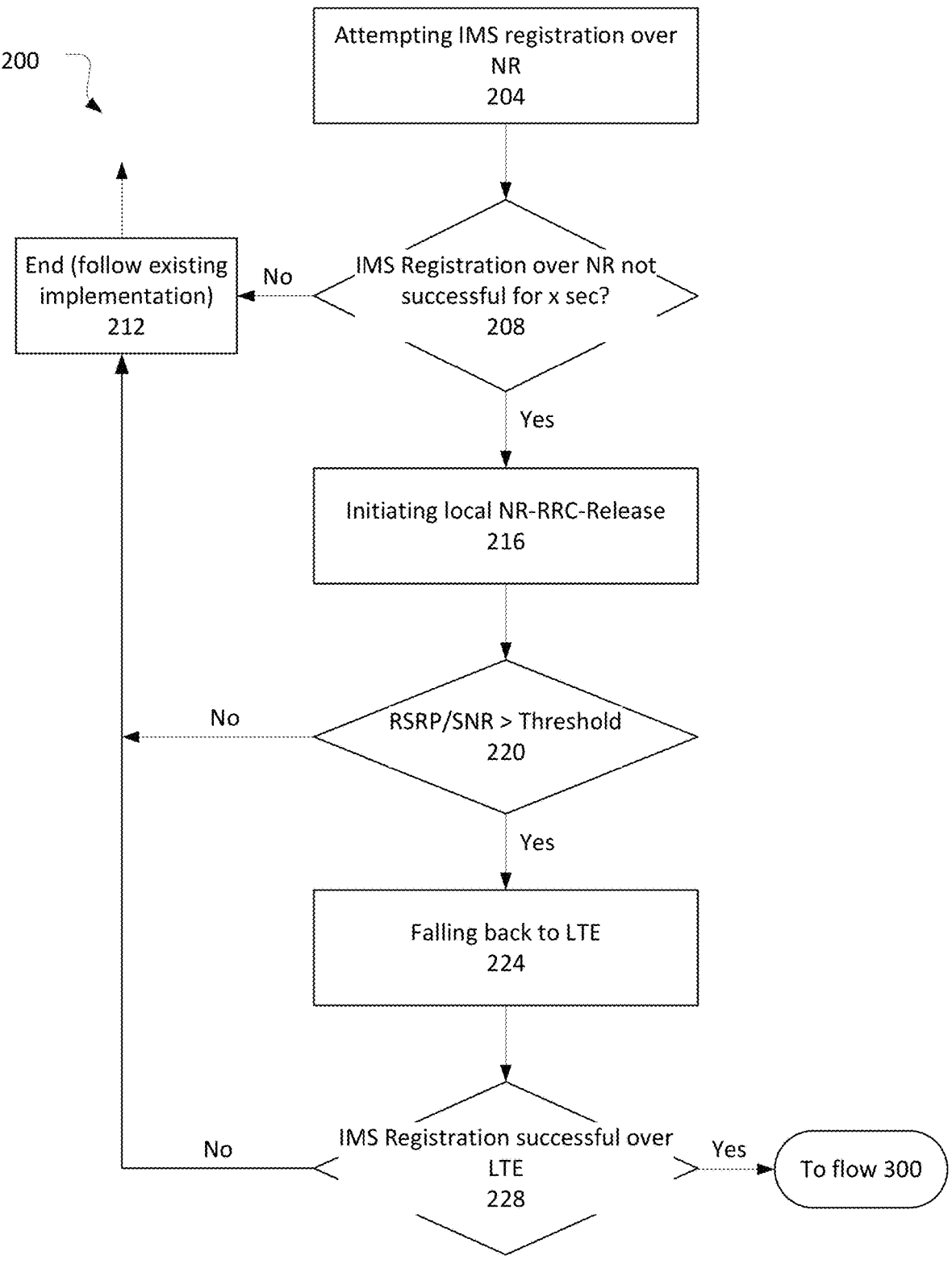
FIG. 2 illustrates a call flow in accordance with some embodiments.
Figure 3:
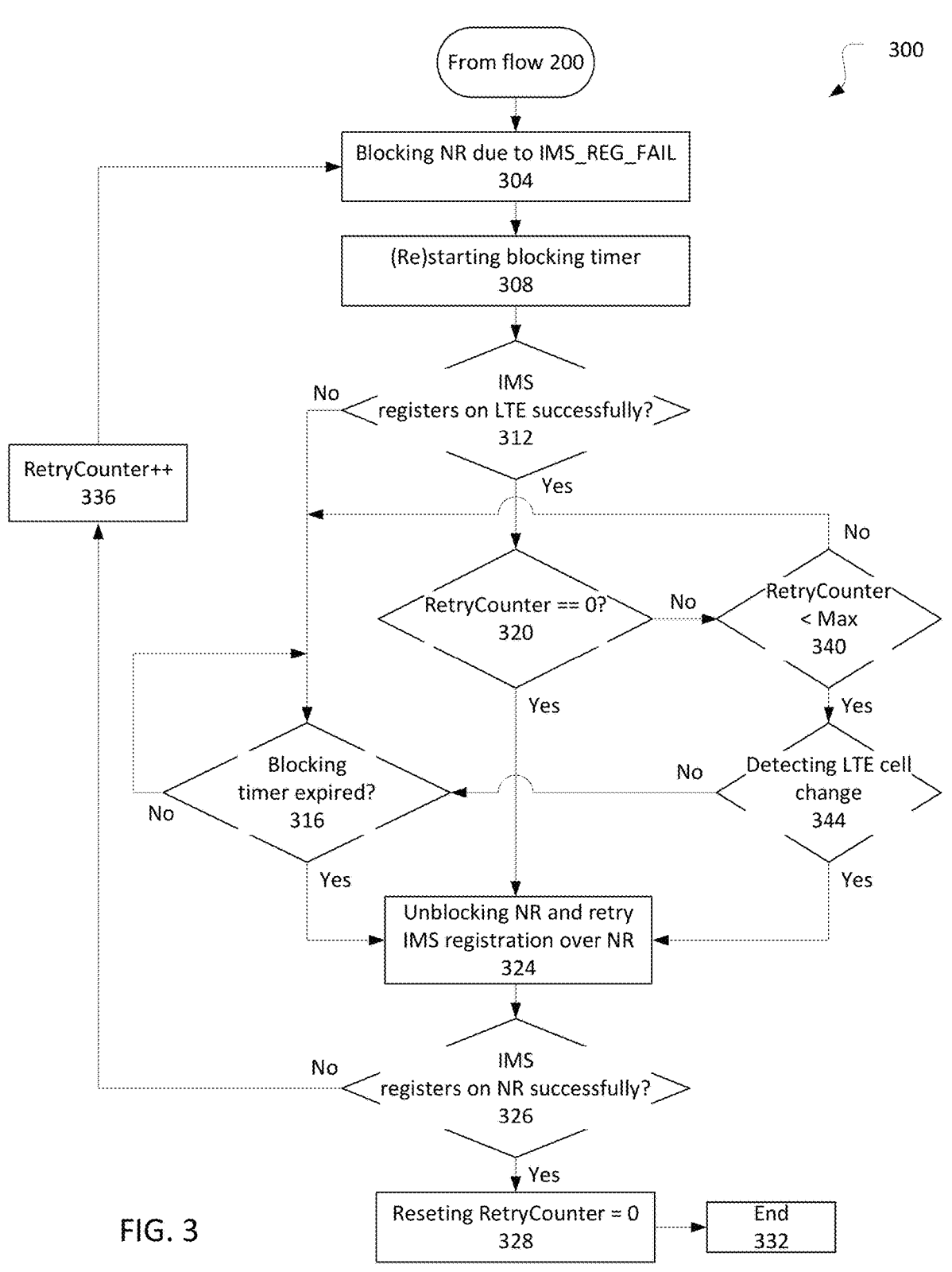
FIG. 3 illustrates another call flow in accordance with some embodiments.

FIGS. 2 and 3 respectively illustrate call flows 200 and 300 in accordance with some embodiments. The call flows 200/300 may be implemented by circuitry (for example, processing circuitry) of the UE 104.

At 204, the call flow 200 may include attempting an IMS registration over NR.

If it is determined, at 208, that IMS registration over NR is successful within a predetermined period of time (for example, 30 seconds), the call flow 200 may end at 212. At this point, the existing implementation may be followed.

If it is determined, at 208, that IMS registration over NR is not successful for the predetermined period of time, the call flow 200 may advance to initiating a local NR RRC release at 216.

After initiating the local NR RRC release at 216, the call flow 200 may include determining whether a quality of an LTE cell is greater than a threshold. If the quality, which may be based on reference signal receive power (RSRP), reference signal receive quality (RSRQ), or signal-to-noise ratio (SNR), is less than the threshold, the call flow 200 may end at 212. If the quality meets the threshold, the call flow 200 may advance to falling back to LTE at 224.

The call flow 200 may further include determining whether IMS registration is successful over LTE at 228. If IMS registration is not successful over LTE, the call flow 200 may end at 212. If IMS registration is successful over LTE, the call flow 200 may advance to call flow 300.

The call flow 300 may include blocking NR due to IMS registration failure over NR. The blocking of NR may prevent the UE from retrying an IMS registration over NR.

The call flow 300 may further include, at 308, starting or restarting a blocking timer. The blocking timer may be (re)started with a predetermined value such as, for example, 12 minutes.

The call flow 300 may include, at 312, determining whether IMS Registration over LTE is successful. Upon the first instance of call flow 300 (coming from call flow 200), the UE may already be registered on LTE from 224/228. However, upon subsequent instances, the UE 104 may need to re-attempt IMS registration over LTE due to a loss of the IMS registration over LTE at block 324, described below.

If, at 312, IMS Registration over LTE is not successful, then the call flow 300 may advance to 316 and will wait there until the blocking timer expires.

If, at 312, IMS Registration over LTE is successful, then the call flow 300 may advance to determining whether a retry counter equals zero at 320.

If, at 320, the retry counter equals zero (meaning that IMS registration over NR has not yet been attempted in the context of call flow 300) or the blocking timer expires at 316, then the call flow 300 advances to unblocking NR and retrying IMS registration over NR at 324. In order to retry IMS registration over NR, the UE 104 may perform an LTE-to-NR reselection and, therefore, lose the IMS registration over LTE.

The call flow 300 may include determining whether IMS registers on NR successfully at 326.

If it is determined that registration over NR is successful at 326, the call flow may advance to resetting the retry counter to zero at 328 and ending at 332.

If it is determined that registration over NR is not successful at 326, the call flow 300 may advance to incrementing the retry counter by one at 336 and advancing to blocking NR due to IMS registration failure at 304. The UE may also attempt to perform an IMS registration on LTE again.

If it is determined, at 320, that the retry counter is not equal to zero (meaning that IMS registration over NR has been attempted at least one time in call flow 300), the call flow 300 advances to 340 to determine whether the retry counter is less than a maximum threshold (e.g., 3).

If it is determined, at 340, that the retry counter is not less than the maximum threshold, then the call flow 300 may advance to 316 and will wait there until the blocking timer expires.

If it is determined, at 340, that the retry counter is less than the maximum threshold, the call flow 300 may advance to detecting for an LTE cell change at 344.

If an LTE cell change is not detected at 344, then the call flow 300 may advance to 316 and will wait there until blocking timer expires.

If an LTE cell change is detected at 344, the call flow 300 may advance to unblocking NR and retrying an IMS registration over NR at 320.

Figure 4:
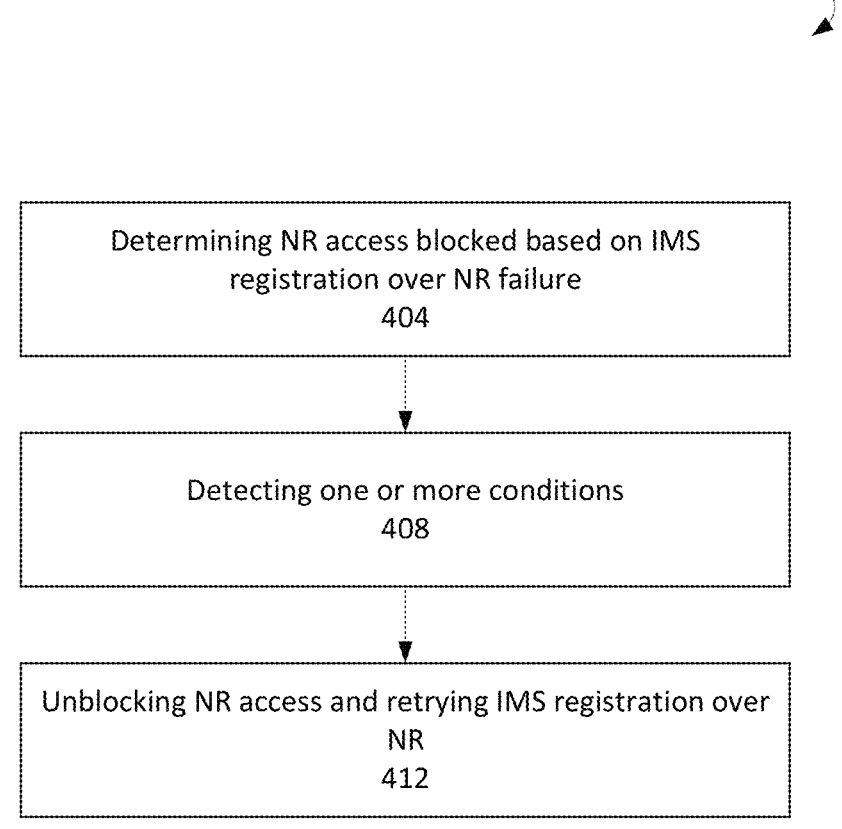
FIG. 4 illustrates an operation flow/algorithmic structure in accordance with some embodiments.

FIG. 4 illustrates an operation flow/algorithmic structure 400 in accordance with some embodiments. The operation flow/algorithmic structure 400 may be implemented by a UE such as, for example, UE 104, UE 600, or components thereof; for example, processors 604.

The operation flow/algorithmic structure 400 may include, at 404, determining NR access is blocked based on IMS registration over NR failure.

The operation flow/algorithmic structure 400 may further include, at 408, detecting one or more conditions. In various embodiments, the conditions may be related to whether the UE performs a successful IMS registration on LTE, a condition of a blocking timer, an LTE cell change condition, or a value of a retry counter. In general, these conditions may be similar to those described above with respect to blocks 312, 316, 320, 340, and 344 of FIG. 3.

Upon detecting the one or more conditions at 408, the operation flow/algorithmic structure 400 may advance to unblocking NR access and retrying IMS registration over NR at 412.

While embodiments of the present disclosure describe managing IMS registration over NR and LTE, other embodiments may also apply to other RATs. For example, in some embodiments, if a UE determines that access to a first RAT is blocked due to IMS registration failure over the first RAT, it may attempt to detect conditions (including some related to conditional access to a fallback, second RAT) and, if detected, may unblock access to the first RAT and retry IMS registration over the first RAT.

Figure 5:
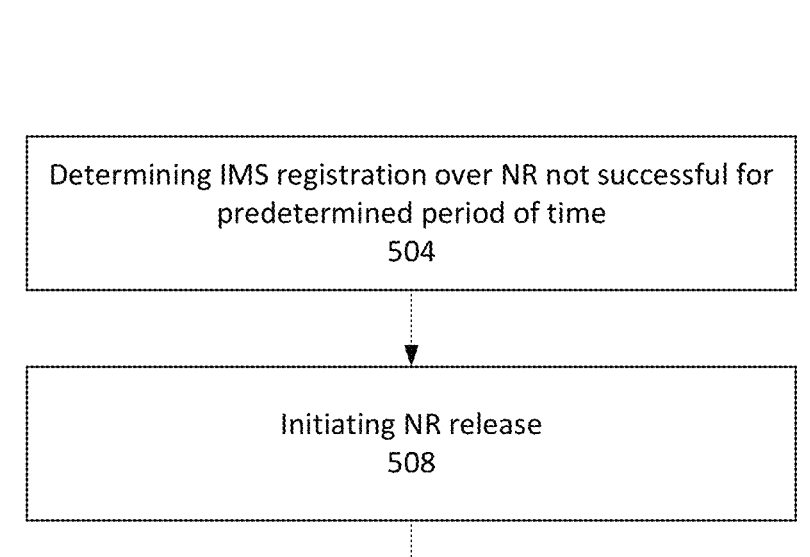
FIG. 5 illustrates another operation flow/algorithmic structure in accordance with some embodiments.

FIG. 5 illustrates an operation flow/algorithmic structure 500 in accordance with some embodiments. The operation flow/algorithmic structure 500 may be implemented by a UE such as, for example, UE 104, UE 600, or components thereof for example, processors 604.

The operation flow/algorithmic structure 500 may include, at 504, determining IMS registration over NR is not successful for a predetermined period of time. In some embodiments, the predetermined period of time is 30 seconds.

The operation flow/algorithmic structure 500 may further include, at 508, initiating an NR release. This may be based on determination at block 504.

The operation flow/algorithmic structure 500 may further include, at 512, attempting to perform an IMS registration over LTE. If IMS registration over LTE is successful, NR access may be blocked until one or more conditions are met. These conditions may relate to a blocking timer, an LTE cell change condition, or a value of a retry counter. In general, these conditions may be similar to those described above with respect to blocks 312, 316, 320, 340, and 344 of FIG. 3.

Figure 6:
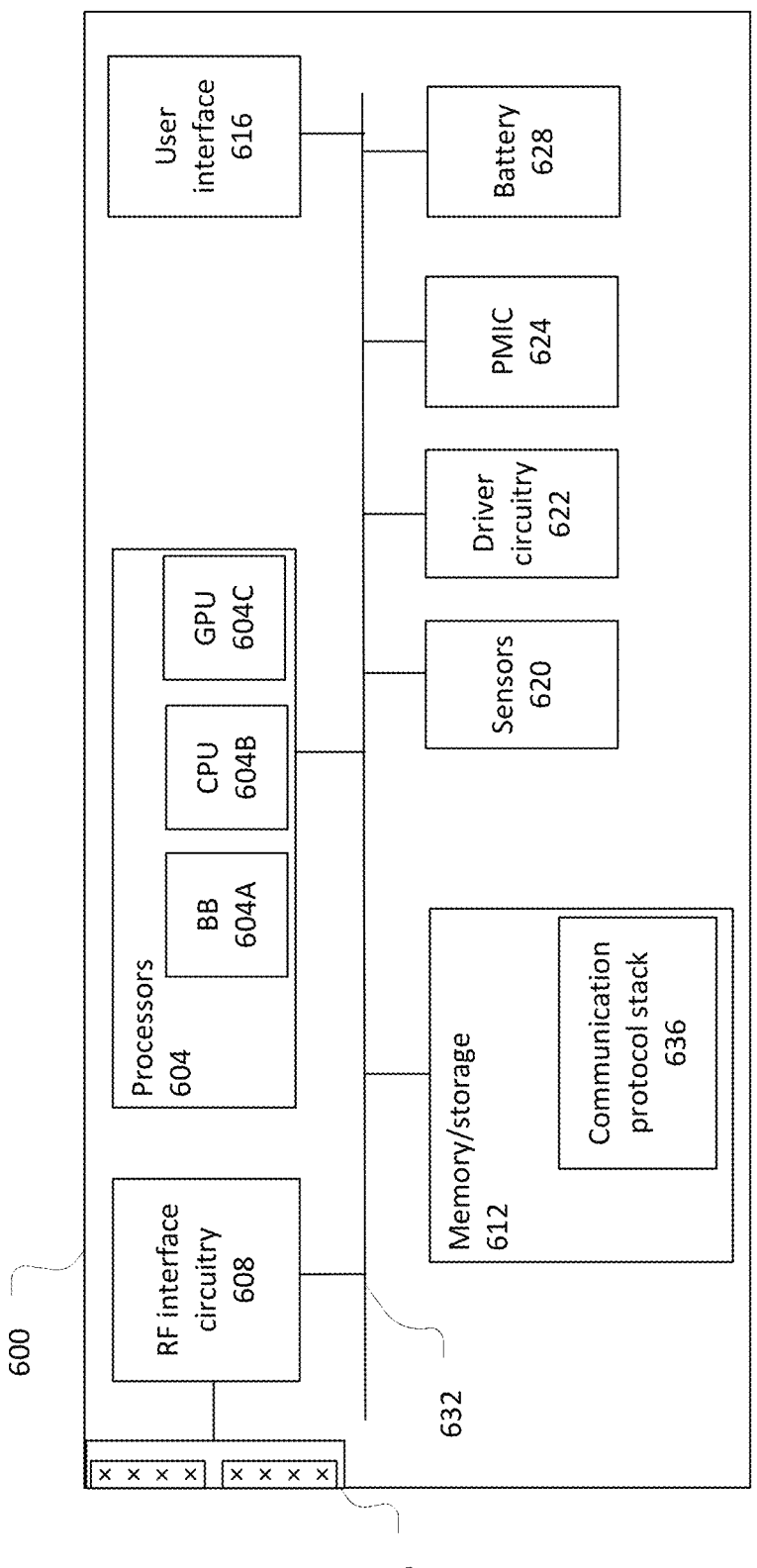
FIG. 6 illustrates a user equipment in accordance with some embodiments.

FIG. 6 illustrates a UE 600 in accordance with some embodiments. The UE 600 may be similar to and substantially interchangeable with UE 104 of FIG. 1.

The UE 600 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, or actuators), video surveillance/monitoring devices (for example, cameras or video cameras), wearable devices (for example, a smart watch), or Internet-of-things devices.

The UE 600 may include processors 604, RF interface circuitry 608, memory/storage 612, user interface 616, sensors 620, driver circuitry 622, power management integrated circuit (PMIC) 624, antenna structure 626, and battery 628. The components of the UE 600 may be implemented as integrated circuits (ICs), portions thereof, discrete electronic devices, or other modules, logic, hardware, software, firmware, or a combination thereof. The block diagram of FIG.

6 is intended to show a high-level view of some of the components of the UE 600. However, some of the components shown may be omitted, additional components may be present, and different arrangement of the components shown may occur in other implementations.

The components of the UE 600 may be coupled with various other components over one or more interconnects 632, which may represent any type of interface, input/output, bus (local, system, or expansion), transmission line, trace, or optical connection that allows various circuit components (on common or different chips or chipsets) to interact with one another.

The processors 604 may include processor circuitry such as, for example, baseband processor circuitry (BB) 604A, central processor unit circuitry (CPU) 604B, and graphics processor unit circuitry (GPU) 604C. The processors 604 may include any type of circuitry or processor circuitry that executes or otherwise operates computer-executable instructions, such as program code, software modules, or functional processes from memory/storage 612 to cause the UE 600 to perform operations as described herein (such as those described with respect to call flows 200 and 300, for example).

In some embodiments, the baseband processor circuitry 604A may access a communication protocol stack 636 in the memory/storage 612 to communicate over a 3GPP compatible network. In general, the baseband processor circuitry 604A may access the communication protocol stack 636 to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a NAS layer. In some embodiments, the PHY layer operations may additionally/alternatively be performed by the components of the RF interface circuitry 608.

The baseband processor circuitry 604A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 612 may include one or more non-transitory, computer-readable media that includes instructions (for example, communication protocol stack 636) that may be executed by one or more of the processors 604 to cause the UE 600 to perform various operations described herein. The memory/storage 612 include any type of volatile or non-volatile memory that may be distributed throughout the UE 600. In some embodiments, some of the memory/storage 612 may be located on the processors 604 themselves (for example, L1 and L2 cache), while other memory/storage 612 is external to the processors 604 but accessible thereto via a memory interface. The memory/storage 612 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 608 may include transceiver circuitry and radio frequency front module (RFEM) that allows the UE 600 to communicate with other devices over a radio access network. The RF interface circuitry 608 may include various elements arranged in transmit or receive paths. These elements may include, for example, switches, mixers, amplifiers, filters, synthesizer circuitry, and control circuitry.

In the receive path, the RFEM may receive a radiated signal from an air interface via antenna structure 626 and proceed to filter and amplify (with a low-noise amplifier) the signal. The signal may be provided to a receiver of the transceiver that down-converts the RF signal into a baseband signal that is provided to the baseband processor of the processors 604.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 626.

In various embodiments, the RF interface circuitry 608 may be configured to transmit/receive signals in a manner compatible with NR access technologies.

The antenna 626 may include antenna elements to convert electrical signals into radio waves to travel through the air and to convert received radio waves into electrical signals. The antenna elements may be arranged into one or more antenna panels. The antenna 626 may have antenna panels that are omnidirectional, directional, or a combination thereof to enable beamforming and multiple input, multiple output communications. The antenna 626 may include microstrip antennas, printed antennas fabricated on the surface of one or more printed circuit boards, patch antennas, or phased array antennas. The antenna 626 may have one or more panels designed for specific frequency bands including bands in FR1 or FR2.

The user interface circuitry 616 includes various input/output (I/O) devices designed to enable user interaction with the UE 600. The user interface 616 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, and projectors), with the output of characters, graphics, multimedia objects, and the like being generated or produced from the operation of the UE 600.

The sensors 620 may include devices, modules, or subsystems whose purpose is to detect events or changes in its environment and send the information (sensor data) about the detected events to some other device, module, or subsystem. Examples of such sensors include inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; and microphones or other like audio capture devices.

The driver circuitry 622 may include software and hardware elements that operate to control particular devices that are embedded in the UE 600, attached to the UE 600, or otherwise communicatively coupled with the UE 600. The driver circuitry 622 may include individual drivers allowing other components to interact with or control various input/output (I/O) devices that may be present within, or connected to, the UE 600. For example, driver circuitry 622 may include a display driver to control and allow access to a display device, a touchscreen driver to control and allow access to a touchscreen interface, sensor drivers to obtain sensor readings of sensor circuitry 620 and control and allow access to sensor circuitry 620, drivers to obtain actuator positions of electro-mechanic components or control and allow access to the electro-mechanic components, a camera driver to control and allow access to an embedded image capture device, audio drivers to control and allow access to one or more audio devices.

The PMIC 624 may manage power provided to various components of the UE 600. In particular, with respect to the processors 604, the PMIC 624 may control power-source selection, voltage scaling, battery charging, or DC-to-DC conversion.

In some embodiments, the PMIC 624 may control, or otherwise be part of, various power saving mechanisms of the UE 600 including DRX as discussed herein.

A battery 628 may power the UE 600, although in some examples the UE 600 may be mounted deployed in a fixed location, and may have a power supply coupled to an electrical grid. The battery 628 may be a lithium ion battery, a metal-air battery, such as a zinc-air battery, an aluminum-air battery, a lithium-air battery, and the like. In some implementations, such as in vehicle-based applications, the battery 628 may be a typical lead-acid automotive battery.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, or network element as described above in connection with one or more of the preceding figures may be configured to operate in accordance with one or more of the examples set forth below in the example section.

EXAMPLES

In the following sections, further exemplary embodiments are provided.

Example 1 includes a method comprising: determining an Internet protocol multimedia subsystem (IMS) registration over New Radio (NR) is not successful for a predetermined period of time; initiating an NR release based on said determining; and attempting to perform an IMS registration over Long Term Evolution (LTE) based on said determining.

Example 2 includes the method of example 1 or some other example herein, wherein the predetermined period of time is 30 seconds.

Example 3 includes a method of example 1 or some other example herein, further comprising: successfully performing the IMS registration over LTE; and blocking NR access based on successful performance of the IMS registration over LTE.

Example 4 includes the method of example 3 or some other example herein, further comprising: determining a retry counter is equal to zero, the retry counter to track a number of times retries of an IMS registration over NR is unsuccessful; and unblocking NR access and retrying IMS registration over NR based on said determining the retry counter is equal to zero.

Example 5 includes the method of example 3 or some other example herein, further comprising: determining a retry counter is not equal to zero, the retry counter to track a number of times retries of an IMS registration over NR is unsuccessful; determining, based on determining the retry counter is not equal to zero, the retry counter is less than a predetermined threshold of retry attempts; detecting, based on determining the retry counter is less than the predetermined threshold, an LTE cell change; and unblocking NR access and retrying IMS registration over NR based on said detecting the LTE cell change.

Example 6 includes the method of example 3 or some other example herein, further comprising: starting or restarting a blocking timer after said blocking of NR access; determining a retry counter is not equal to zero, the retry counter to track a number of times retries of an IMS registration over NR is unsuccessful; determining, based on determining the retry counter is not equal to zero, the retry counter is not less than a predetermined threshold of retry attempts; detecting, based on determining the retry counter is not less than the predetermined threshold, an expiration of the blocking timer; and unblocking NR access and retrying IMS registration over NR based on said detecting of the expiration of the blocking timer.

Example 7 includes a method of example 3 or some other example herein, further comprising: starting or restarting a blocking timer after said blocking of NR access; determining a retry counter is not equal to zero, the retry counter to track a number of times retries of an IMS registration over NR is unsuccessful; determining, based on determining the retry counter is not equal to zero, the retry counter is less than a predetermined threshold of retry attempts; determining, based on determining the retry counter is less than the predetermined threshold, an LTE cell change is not detected; detecting, based on determining the LTE cell change is not detected, an expiration of the blocking timer; and unblocking NR access and retrying IMS registration over NR based on said detecting of the expiration of the blocking timer.

Example 8 includes the method of example 6 or example 7 or some other example herein, further comprising: setting a value of the blocking timer to twelve minutes.

Example 9 includes the method of any one of examples 5-7 or some other example herein, wherein the predetermined threshold is three.

Example 10 includes the method of any one of examples 4-7 or some other example herein, further comprising: determining retrying IMS registration over NR is unsuccessful; and based on said determining the retrying IMS registration over NR is unsuccessful, incrementing the retry counter and blocking NR access.

Example 11 includes the method of example 10 or some other example herein, wherein retrying IMS registration over NR includes performing LTE to NR reselection and the method further comprises: attempting an IMS registration over LTE based on said determining the retrying IMS registration over NR is unsuccessful.

Example 12 may include a method of operating a UE, the method comprising: determining NR access is blocked based on an IMS registration over NR failure; and unblocking NR access and retrying IMS registration over NR based on said determination that NR access is blocked based on the IMS registration over NR failure.

Example 13 may include the method of example 12 or some other example herein, further comprising: starting a blocking timer based on said determination that NR access is blocked based on the IMS registration over NR failure; detecting an expiration of the blocking timer; and unblocking NR access and retrying IMS registration over NR based further on detection of the expiration of the blocking timer.

Example 14 may include the method of example 12 or some other example herein, further comprising: successfully performing IMS registration over LTE.

Example 15 may include the method of example 14 or some other example herein, further comprising: determining, based on successful performance of the IMS registration over LTE, a retry counter is equal to zero, the retry counter to track a number of times retries of the IMS registration over NR is unsuccessful; and unblocking NR access and retrying IMS registration over NR based further on said determination that the retry counter is equal to zero.

Example 16 may include the method of example 14 or some other example herein, further comprising: determining, based on successful performance of the IMS registration over LTE, a retry counter is not equal to zero and is less than a predetermined threshold, the retry counter to track a number of times retries of the IMS registration over NR is unsuccessful; determining an LTE cell has changed; and unblocking NR access and retrying IMS registration over NR based further on said determination that the retry counter is not equal to zero and is less than the predetermined threshold and said determination that the LTE cell has changed.

Example 17 may include a method of operating a UE, the method comprising determining access to the first RAT is blocked based on an Internet protocol multimedia subsystem (IMS) registration over the first RAT failure; and unblocking access to the first RAT and retrying IMS registration over the first RAT based on said determination that access to the first RAT is blocked based on the IMS registration over the first RAT failure.

Example 18 may include the method of example 17 or some other example herein, further comprising: starting a blocking timer based on said determination that access to the first RAT is blocked based on the IMS registration over the first RAT failure; detecting an expiration of the blocking timer; and unblocking access to the first RAT and retrying IMS registration over the first RAT based further on detection of the expiration of the blocking timer.

Example 19 may include the method of example 17 or some other example herein, further comprising: successfully performing IMS registration over a second RAT.

Example 20 may include the method of example 19 or some other example herein, further comprising: determining, based on successful performance of the IMS registration over the second RAT, a retry counter is equal to zero, the retry counter to track a number of times retries of the IMS registration over the first RAT is unsuccessful; and unblocking access to the first RAT and retrying IMS registration over the first RAT based further on said determination that the retry counter is equal to zero.

Example 21 may include the method of example 19 or some other example herein, further comprising: determining, based on successful performance of the IMS registration over the second RAT, a retry counter is not equal to zero and is less than a predetermined threshold, the retry counter to track a number of times retries of the IMS registration over the first RAT is unsuccessful; determining a cell of the second RAT has changed; and unblocking access to the first RAT and retrying IMS registration over the first RAT based further on said determination that the retry counter is not equal to zero and is less than the predetermined threshold and said determination that the cell of the second RAT has changed.

Example 22 may include an apparatus comprising means to perform one or more elements of a method described in or related to any of examples 1-21, or any other method or process described herein.

Example 23 may include one or more non-transitory computer-readable media comprising instructions to cause an electronic device, upon execution of the instructions by one or more processors of the electronic device, to perform one or more elements of a method described in or related to any of examples 1-21, or any other method or process described herein.

Example 24 may include an apparatus comprising logic, modules, or circuitry to perform one or more elements of a method described in or related to any of examples 1-21, or any other method or process described herein.

Example 25 may include a method, technique, or process as described in or related to any of examples 1-21, or portions or parts thereof.

Example 26 may include an apparatus comprising: one or more processors and one or more computer-readable media comprising instructions that, when executed by the one or more processors, cause the one or more processors to perform the method, techniques, or process as described in or related to any of examples 1-21, or portions thereof.

Example 27 may include a signal as described in or related to any of examples 1-21, or portions or parts thereof.

Example 28 may include a datagram, information element, packet, frame, segment, PDU, or message as described in or related to any of examples 1-21, or portions or parts thereof, or otherwise described in the present disclosure.

Example 29 may include a signal encoded with data as described in or related to any of examples 1-21, or portions or parts thereof, or otherwise described in the present disclosure.

Example 30 may include a signal encoded with a datagram, IE, packet, frame, segment, PDU, or message as described in or related to any of examples 1-21, or portions or parts thereof, or otherwise described in the present disclosure.

Example 31 may include an electromagnetic signal carrying computer-readable instructions, wherein execution of the computer-readable instructions by one or more processors is to cause the one or more processors to perform the method, techniques, or process as described in or related to any of examples 1-21, or portions thereof.

Example 32 may include a computer program comprising instructions, wherein execution of the program by a processing element is to cause the processing element to carry out the method, techniques, or process as described in or related to any of examples 1-21, or portions thereof.

Example 33 may include a signal in a wireless network as shown and described herein.

Example 34 may include a method of communicating in a wireless network as shown and described herein.

Example 35 may include a system for providing wireless communication as shown and described herein.

Example 36 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory, computer-readable media having instructions that, when executed, cause processor circuitry to:

determine new radio (NR) access is blocked based on an Internet protocol multimedia subsystem (IMS) registration over NR failure;

detect a set of conditions, wherein the set of conditions includes: a determination that IMS registration over Long Term Evolution (LTE) is successful; and at least one additional condition that includes: a determination that a value of a retry counter is zero; a determination that a value of a retry counter is greater than zero and less than a maximum value and an LTE cell has changed; or a determination that a value of a retry counter is greater than zero and less than a maximum value, an LTE cell has not changed, and a blocking timer has expired; and retry IMS registration over NR based on said determination that NR access is blocked based on the IMS registration over NR failure and detection of the set of conditions.

2. The one or more non-transitory, computer-readable media of claim 1, wherein the instructions, when executed, further cause the processor circuitry to:

start a blocking timer based on said determination that NR access is blocked based on the IMS registration over NR failure; and detect an expiration of the blocking timer as a condition of the set of conditions.

3. The one or more non-transitory, computer-readable media of claim 1, wherein the at least one additional condition includes a determination that a value of a retry counter is greater than zero and less than a maximum value, an LTE cell has not changed, and a blocking timer has expired, wherein the retry counter is to track a number of times retries of the IMS registration over NR is unsuccessful.

4. The one or more non-transitory, computer-readable media of claim 3, wherein the at least one additional condition includes a determination that a retry counter is equal to zero, wherein the retry counter is to track a number of times retries of the IMS registration over NR is unsuccessful.

5. The one or more non-transitory, computer-readable media of claim 3, wherein the at least one additional condition includes a determination that a retry counter is greater than zero and less than a maximum value and an LTE cell has changed, wherein the retry counter is to track a number of times retries of the IMS registration over NR is unsuccessful.

6. A method comprising:
determining access to a first radio access technology (RAT) is blocked based on an Internet protocol multimedia subsystem (IMS) registration over the first RAT failure;
detecting a set of conditions, wherein the set of conditions includes: a determination that IMS registration over a second RAT is successful; and at least one additional condition that includes: a determination that a value of a retry counter is zero; a determination that a value of a retry counter is greater than zero and less than a maximum value and a cell of the second RAT has changed; or a determination that a value of a retry counter is greater than zero and less than a maximum value, a cell of the second RAT has not changed, and a blocking timer has expired; and
retrying IMS registration over the first RAT based on said determining that access to the first RAT is blocked based on the IMS registration over the first RAT failure and said detecting the set of conditions.

7. The method of claim 6, further comprising:
starting a blocking timer based on said determining that access to the first RAT is blocked based on the IMS registration over the first RAT failure; and
detecting an expiration of the blocking timer as a condition of the set of conditions.

8. The method of claim 6, wherein the at least one additional condition includes a determination that a value of a retry counter is greater than zero and less than a maximum value, a cell of the second RAT has not changed, and a blocking timer has expired, wherein the retry counter is to track a number of times retries of the IMS registration over NR is unsuccessful.

9. The method of claim 8, wherein detecting the at least one additional condition includes a determination that a retry counter is equal to zero, wherein the retry counter to track a number of times retries of the IMS registration over the first RAT is unsuccessful.

10. The method of claim 8, wherein the at least one additional condition includes a determination that a retry counter is greater than zero and less than a maximum value and a cell of the second RAT has changed, wherein the retry counter tracks a number of times retries of the IMS registration over the first RAT is unsuccessful.

11. A method comprising:
determining an Internet protocol multimedia subsystem (IMS) registration over New Radio (NR) is not successful for a predetermined period of time;
initiating an NR release based on said determining;

successfully performing an IMS registration over Long Term Evolution (LTE) based on said determining the IMS registration over NR is not successful for a predetermined period of time;
detecting, based on successfully performing the IMS over LTE, one or more conditions that includes: a determination that a value of a retry counter is zero; a determination that a value of a retry counter is greater than zero and less than a maximum value and an LTE cell has changed; or a determination that a value of a retry counter is greater than zero and less than a maximum value, an LTE cell has not changed, and a blocking timer has expired; and
retrying IMS registration over NR based on said detecting the one or more conditions.

12. The method of claim 11, wherein the predetermined period of time is 30 seconds.

13. The method of claim 11, further comprising:
blocking NR access based on said successfully performing the IMS registration over LTE.

14. The method of claim 13, wherein the one or more conditions includes a determination that a value of a retry counter is equal to zero, the retry counter to track a number of times retries of an IMS registration over NR is unsuccessful.

15. The method of claim 14, further comprising:
determining retrying IMS registration over NR is unsuccessful; and
based on said determining the retrying IMS registration over NR is unsuccessful, incrementing the retry counter and blocking NR access.

16. The method of claim 15, wherein retrying IMS registration over NR includes performing an LTE-to-NR reselection and the method further comprises:
attempting an IMS registration over LTE based on said determining the retrying IMS registration over NR is unsuccessful.

17. The method of claim 13, wherein the one or more conditions includes a determination that a value of a retry counter is greater than zero and less than a maximum number of retry attempts and an LTE cell has changed, the retry counter to track a number of times retries of an IMS registration over NR is unsuccessful.

18. The method of claim 17, wherein the maximum number is three.

19. The method of claim 13, wherein the one or more conditions includes a determination that a retry counter is greater than zero and less than a maximum number of retry attempts, an LTE cell has not changed, and a blocking timer has expired, the retry counter to track a number of times retries of an IMS registration over NR is unsuccessful and the blocking timer started or restarted after said blocking NR access.

20. The method of claim 19, further comprising:
setting a value of the blocking timer to twelve minutes.

* * * * *